United States Patent [19]

Bonnaure

[11] 4,023,963
[45] May 17, 1977

[54] PROCESS FOR THE DIRECT REDUCTION OF MINERALS ON A CONTINUOUS GRATE

[75] Inventor: Edouard Bonnaure, Le Vesinet, France

[73] Assignee: Creusot-Loire Entreprises, Paris, France

[22] Filed: May 9, 1975

[21] Appl. No.: 575,997

[30] Foreign Application Priority Data

May 10, 1974 France .............................. 74.16202

[52] U.S. Cl. ......................................... 75/35; 75/5; 75/91; 266/178
[51] Int. Cl.² .......................................... C21B 13/00
[58] Field of Search .................. 75/3, 5, 35, 91, 4, 75/34; 266/21, 178, 179, 180, 177

[56] References Cited

UNITED STATES PATENTS 3,005,699  10/1964  Erck ...................... 75/35
3,890,142  6/1975  Celada .................. 75/35

FOREIGN PATENTS OR APPLICATIONS 2,181,558  7/1973  France
2,197,071  3/1974  France

*Primary Examiner*—G. Ozaki
*Assistant Examiner*—Michael L. Lewis
*Attorney, Agent, or Firm*—Cameron, Kerkam, Sutton, Stowell & Stowell

[57] ABSTRACT

In a method of reduction of a mineral on a continuous moving grate, the material layer is passed through a plurality of processing zones of the grate on a layer of chemically inert material and the gas flows through the layers in the zones alternate between a downward direction and an upward direction to limit the temperature of the grate and to use the heat taken up by the inert layer to heat the processing gases.

5 Claims, 4 Drawing Figures

PROCESS FOR THE DIRECT REDUCTION OF MINERALS ON A CONTINUOUS GRATE

The present invention concerns a method of reduction of minerals, more particularly but not exclusively minerals of iron with a view to the manufacture of deoxidized solid products such as prereduced pellets, spongy iron, sponge-iron, etc.

Deoxidized solid products of this kind were initially manufactured by methods such as the fluidized-bed method over a hearth or in vertical-shaft or revolving drum reduction furnaces.

To enable bigger outputs there was then developed a method of direct reduction on a continuous grate by employing as reducing agent a gas flow or pure hydrogen or of a mixture of hydrogen and carbon monoxide. The latter method is the subject of French Pat. No. 2,181,558 filed on the Apr. 28, 1972 and of its Patent of Addition No. 2,197,071 filed on the Aug. 24, 1972. In the continuous direct reduction by hydrogen as described in these patent applications it is essential, in order to obtain good kinetics of the reduction reaction, to have available a flow of hydrogen at a temperature of the order to 900° C. This poses rather a large number of technological difficulties. Moreover in use of this method the hottest zone of the layer of minerals being reduced is generally the bottom zone next to the bars of the grate. This poses problems of mechanical behaviour of the bars at high temperatures, which makes it essential to make them of special and hence costly alloys.

It is an object of the present invention to provide a method of reduction of minerals on an endless moving grate without the above disadvantage.

In accordance with the present invention there is provided a method of reduction of minerals using an endless moving grate, comprising a relatively thick layer of chemically inert screened material, thereafter charging the grate with a layer of mineral to be reduced, and passing the mineral layer on the inert material layer successively through a zone of heating or oxidizing firing in which the layers are traversed from top to bottom by a neutral or oxidizing gases which heats up the inert material layer, a zone of primary reduction in which a mixture of carbon monoxide and hydrogen gas is introduced at a temperature of 1100° C and traverses the layers from top to bottom, continuing the heating up of the inert material layer, a zone of secondary reduction in which hydrogen gas is introduced at a temperature of about 700° C and traverses the layers from bottom to top, a cooling zone in which the layers are traversed in a first portion by a flow of cold hydrogen passing from bottom to top of the layers and in a second portion by another flow of cold hydrogen passing from top to bottom of the layers, the two flows having traversed the layers being then mixed in proportions suitable for obtaining a flow of about 700° C which is fed to the secondary reduction zone.

In a preferred embodiment of the invention the inert material layer comprises substantially spherical elements of the screened size substantially equal to that of the mineral to be reduced and of a metal of high density and which is chemically inert at the working temperatures.

The invention will be more fully understood from the following description of an embodiment thereof, given by way of example only, with reference to the accompanying drawings:

FIG. 1 is a diagrammatic transverse section of the grate and gas inlet and exhaust hoods, and FIG. 2 is a partial longitudinal section on the axis of the grate;

Figure 1:
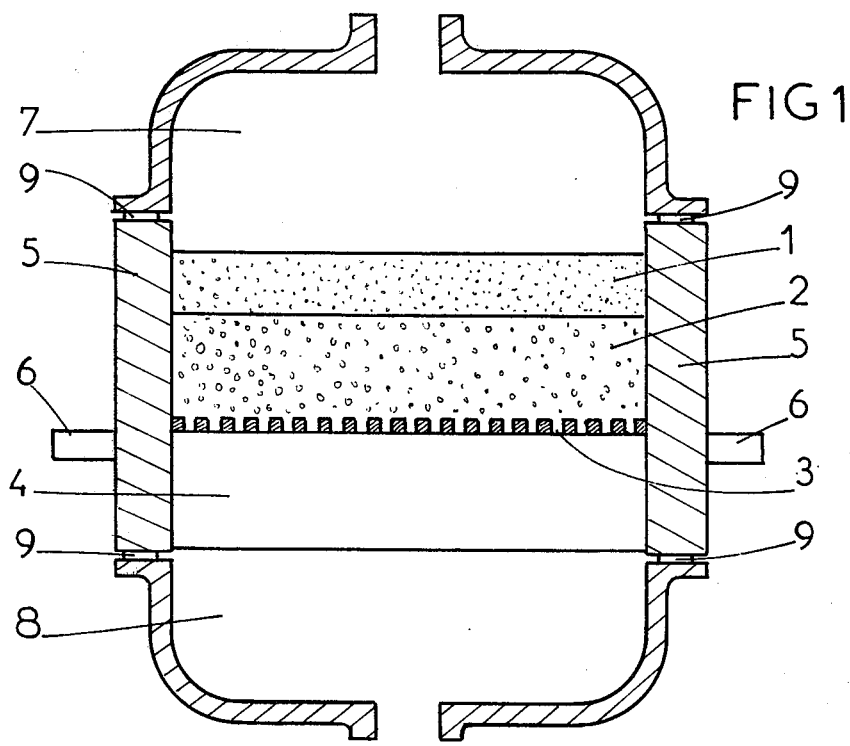
FIGS. 1 and 2 are diagrammatic illustrations of a pair of an installation for use in carrying out the embodiment, and in particular of a moving grate bearing minerals.
Figure 2:
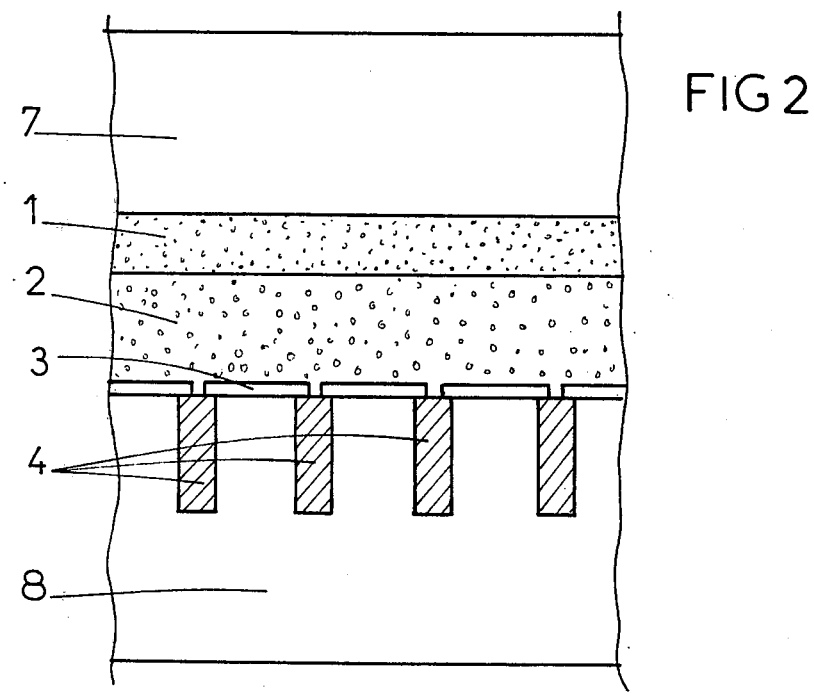

Referring first to FIGS. 1 and 2, a layer 1 of mineral material to be reduced of a thickness of approximately 30 cm with a mean screen of 10 mm, is arranged on top of an inert layer 2 of a thickness of about 50 cm and consisting of balls of special steel of a screen size of the same order as that of the material to be processed. The layers 1 and 2 are supported by grate bars 3 which in turn bear on crossbars 4 fast with the side walls 5 of the moving grate. A device for supporting and driving the endless moving grate is shown diagrammatically at 6. The grate circulates between a series of upper and lower fixed hoods 7 and 8 respectively. Gas tightness between the hoods and the side walls of the moving grate is ensured by seals 9 which are well known in the art and are therefore shown here only diagrammatically. For the same reason devices pounding transverse gastightness between the successive processing zones are not shown in FIG. 2.

Figure 3:
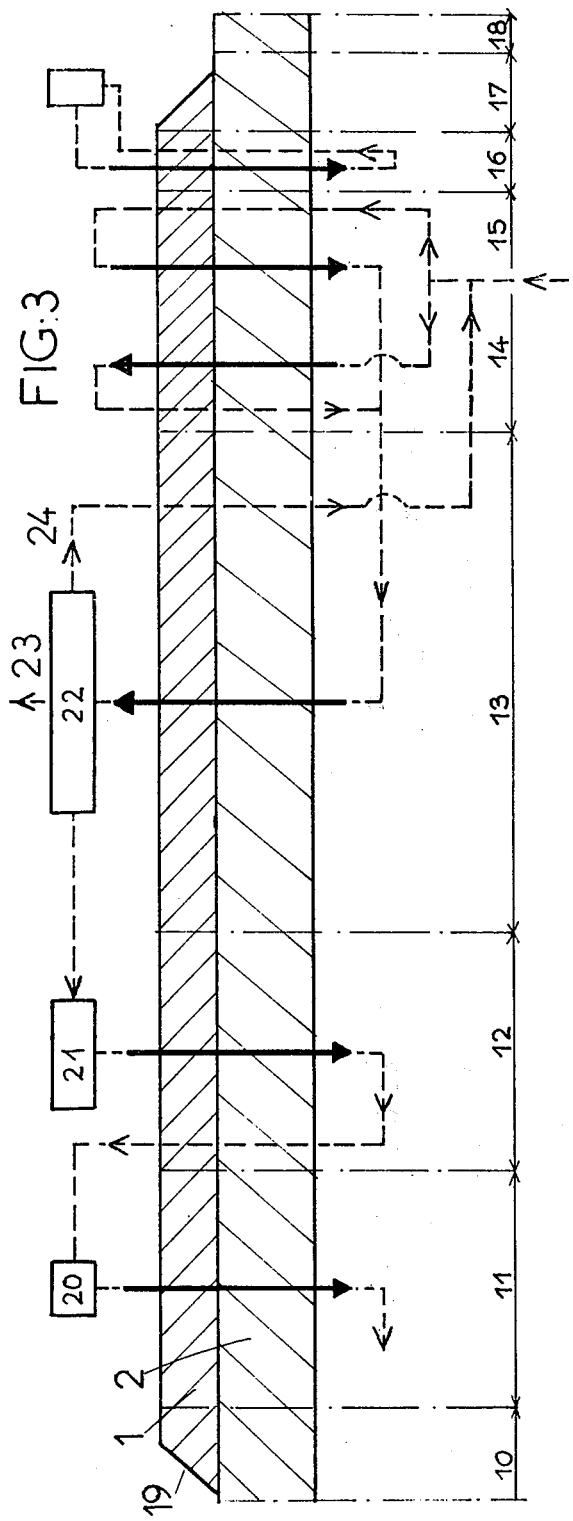
FIG. 3 is a flow diagram of the materials and gases in the various processing zones of the grate.
Figure 4:
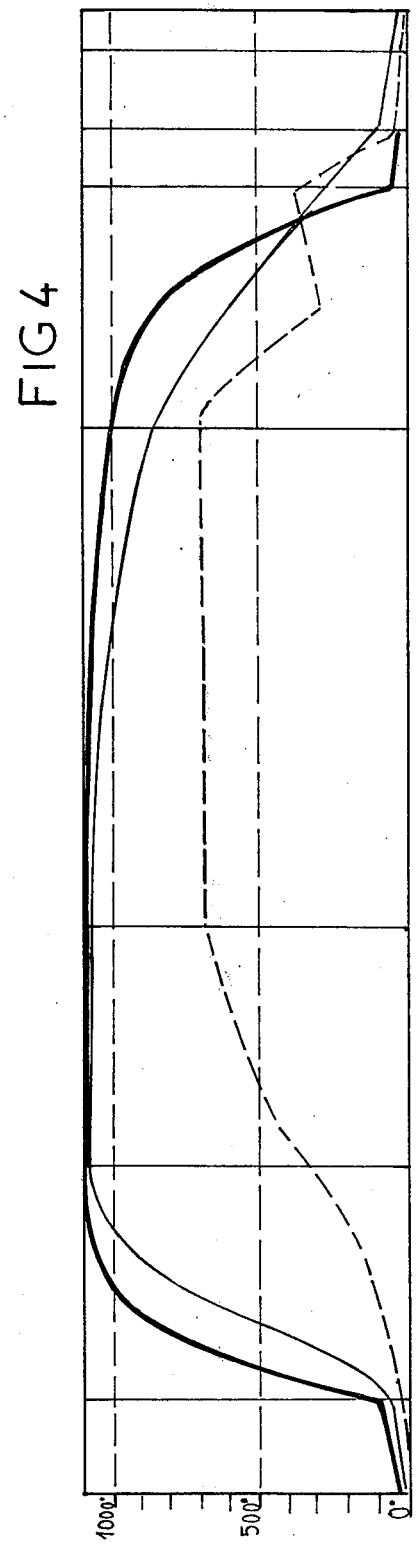
FIG. 4 is a graph showing the temperatures reached at various depths in the layer of minerals on the grate in the various phases of the processing.

Reference will now be made to FIGS. 3 and 4 in order to follow the various phases of the method and the development of the temperature in the mineral layer 1 and in the underlayer 2 interposed between the mineral layer 1 and the grate. In FIG. 3 there is shown by thick solid lines the paths of gases which traverse both the mineral layer 1 and the inert underlayer 2. The paths of the gases outside the layers 1 and 2 or even outside the sequence are shown by broken lines. In FIG. 4 the curve shown by a thick solid line corresponds with the temperature Ts reached in the top portion of the layer 1 of material to be reduced. The curve shown by a thin solid line gives the temperature Tm recorded at the boundary between the layers 1 and 2. The curve shown by a broken line gives the temperature Ti recorded in the bottom of the inert layer 2, that is to say, at the level of the bars of the grate.

Zone 10 is a zone for charging and drying the material to be reduced. This material may be either screened minerals or screened sinter or pellets oxidized and previously hardened or "green" oxidized pellets, that is to say, moist, being direct from pelletizing apparatus and which in this zone will undergo suitable drying. This material will be poured at 19 onto the thick inert layer 2. This layer remains permanently on the grate if this is of a horizontal circular type. If the grate is a straight chain with an inverted return run the inert layer 2 is of course reformed at the start of the active portion of the grate. The drying in zone 10 is effected in quite conventional fashion by circulation of gases or hot air and for this reason the circulation of the gases has not been shown for this portion.

Zone 11 is a heating or firing zone in which neutral or oxidizing gases flow from top to bottom through the layers 1 and 2. These hot gases are produced in a normal fashion in a device 20, for example, by burning gas with possible recuperation wholly or partially of the sensible and latent heat of the gases from the subsequent reduction zones. These gases by passing through the layer bring the whole of the layer of material to be reduced progressively to a temperature of about 1100° C and at the same time heat up the inert layer 2 lying below, before being exhausted or possibly recuperated. At the output from this zone 11 the temperatures Ts and Tm have therefore reached about 1100° C whereas the bottom portion of the inert layer and the bars of the grate are still only at a temperature of 300° to 400° C.

Zone 12 is a zone of primary reduction or prereduction in which the circulating gases are a mixture of carbon monoxide and hydrogen manufactured in the device 21, for example, by incomplete combustion of natural gas with hot air, with a degree of oxidation from 0.15 to 0.30 and a specific flow of the order of 3000 Nm³/ton of iron processed per hour. These gases at about 1100° C pass through the layers 1 and 2 from top to bottom. In this zone prereduction is effected at practically constant temperature, that is to say, Ts and Tm remain substantially at 1100° C whilst the inert layer 2 continues to be heated up until it reaches at the end of the zone 12 a temperature of about 700° C which may be considered the maximum admissible temperature for ordinary cheap grate-bars. The time spent by the material in passing through this zone 12 is about 15 minutes. It may be observed that in the usual way the device 21 for manufacturing the gas mixture can recuperate the sensible and latent heat of the gases leaving other subsequent reduction zones.

Zone 13 is the main reduction zone employing a flow of hydrogen with a weak degree of oxidation and with a specific flow of the same order as that employed in the primary reduction zone 12. The flow of hydrogen gas reaches the zone 13 at about 700° C from the downstream cooling zone. The flow of hydrogen passes through the layers 2 and 1 from the bottom upwards. Under these conditions the temperature Ti in the vicinity of the bars remains equal to about 700° C but the hydrogen is heated up progressively in passing through the layer 2 and the reduction of the mineral is carried out at a temperature lying between 850° and 1100° C, which corresponds to excellent reaction kinetics. The time spent by the material in passing through this main reduction zone is of the order of 30 to 40 minutes.

The gases resulting from this main or second reduction zone, composed mainly of hydrogen and steam, are passed into a conventional processing unit 22 in which their sensible heat is recuperated in order to employ it, for example, in the device 21 or in other installations 23, whilst the cooled and dried hydrogen leaves at 24 to be reused.

The zone for cooling after reduction comprises in fact two portions 14, 15. In each of the two portions there is employed as coolant gas cold hydrogen from the processing unit 22 mixed with fresh hydrogen 25.

In the first portion 14 of the cooling zone the cold hydrogen is brought under the grate and passes through the layers 2 and 1 from the bottom upwards. This enables the temperature of the bars of the grate not to be increased and may even produce a lowering of the temperature of the grate and that of the underlayer 2 more rapidly than that of the mineral layer 1.

In the second portion 15 of the cooling zone the cold hydrogen is brought to above the layer 1 and passes through the two layers from top to bottom in order to accelerate the cooling of the mineral layer 1. The temperature of the bottom of layer 2 tends to rise again slightly but without risk of exceeding the limit of 700° C. Temperature regulation is obtained by flow distribution between the two cooling flows and if necessary by preheating the first flow by employing the heat recuperated in the device 23. Similarly by flow distribution the temperature of the mixture of the two output flows, which constitutes the main reducing flow in the preceding zone 13, can be regulated to about 700° C.

Zone 16 is a normal final cooling zone employing a neutral gas circulating in a closed circuit through an exchanger. By acting on the composition of this gas one can if the occasion arises ensure passivation of spongy iron, that is to say, render it less sensitive to possible subsequent reoxidation.

Finally zones 17 and 19 are respectively a zone 17 for discharge of the reduced products, for example, by magnetic devices, and a zone 18 for possible cleaning of the thick inert layer 2. In the case of a circular grate the end of the zone 18 corresponds with the start of the zone 10.

It will be observed that the method which has just been described includes phases in which a portion of the sensible heat in the processing gases is accumulated by heating the inert zone 2. This sensible heat is then restored in the main reduction phase with the result that the heating up to about 1100° C of the reducing hydrogen flow is effected here on the spot and just before the reduction proper. The method in the end only requires cold hydrogen which is brought progressively to the temperature of 1100° C, ensuring the best reduction kinetics in two stages, by employing the hydrogen to cool the reduced products, which brings the hydrogen up to about 700° C, the second raising of the temperature of the hydrogen taking place while it passes through the layer 2 from the bottom upwards before reaching the layer 1 where the required reduction is carried out.

It will be observed also that the alternation of the directions of flow of the gases through the layers enables the temperature to be limited to about 700° C in the bottom portion of the underlayer 2 and the bars of the grate; the latter may therefore be of ordinary material.

It may also be observed that, because of the very high temperatures at which the reduction can easily be carried out, the reduced products are subject very little to pyrophorism and reoxidation.

It will be appreciated the invention is not intended to be strictly limited to the embodiment which has been described by way of example but includes embodiments which differed from it in detail or in the employment of equivalent means.

What is claimed is:

1. A method of reduction of minerals using an endless moving grate producing deoxidized minerals comprising the steps of charging the grate with a first layer about 50 cm thick of chemically inert metallic material comprising substantially spherical elements of a screened size substantially equal to that of the mineral to be reduced, charging upon said first layer a second layer of mineral to be reduced, heating or oxidizing firing both layers from top to bottom by a flow of neutral or oxidizing gases which heats up said inert first layer, primarily reducing said second layer by a mixed flow of carbon monoxide and hydrogen gas at a temperature of 1100° C traversing the layers from top to bottom and continuing the heating of said first inert layer, secondarily reducing said second layer by a flow of hydrogen gas introduced at a temperature of about 700° C and traversing the layers from bottom to top with heating thereof up to 1100° C by traversing the inert metallic layer, primarily cooling said layers by a flow of cold hydrogen passing from bottom to top through said layers, secondarily cooling said layers by a flow of cold hydrogen passing from top to bottom through said layers, mixing said two flows which have traversed said layers in proportions suitable for obtaining a flow at about 700° C, recycling said mixture as at least a portion of said flow of hydrogen gas for said secondary reduction and then discharging the reduced minerals from the grate.

2. A method as claimed in claim 1, including the step after said secondary cooling step of passing a flow of neutral gas through said layers from top to bottom.

3. A method as claimed in claim 1 wherein the metal is of high density.

4. A method as claimed in claim 3, wherein said elements of the inert material layer are non-magnetic.

5. A method as claimed in claim 3, wherein said elements of the inert material layer are very weakly magnetic.

* * * * *